United States Patent [19]
Tsien

[11] Patent Number: 5,283,433
[45] Date of Patent: Feb. 1, 1994

[54] SCANNING CONFOCAL MICROSCOPE PROVIDING A CONTINUOUS DISPLAY

[75] Inventor: Roger Y. Tsien, La Jolla, Calif.

[73] Assignee: The Regents of the University of California, Oakland, Calif.

[21] Appl. No.: 958,038

[22] Filed: Oct. 5, 1992

[51] Int. Cl.$^5$ .............................................. H01J 3/14
[52] U.S. Cl. .............................. 250/234; 250/486.1; 359/368
[58] Field of Search ............... 250/216, 234, 235, 236, 250/459.1, 486.1, 327.2; 359/368

[56] References Cited

U.S. PATENT DOCUMENTS 4,827,125  5/1989  Goldstein ........................ 250/234
5,149,972  9/1992  Faye et al. ...................... 250/461.2

OTHER PUBLICATIONS

"Ophtalmoscope A Balayage Optique," J. Cohen Sabban et al., Horizons de l'Optique 83, 1984, vol. 15, pp. 425-430.

Primary Examiner—David C. Nelms
Assistant Examiner—K. Shami
Attorney, Agent, or Firm—Pretty, Schroeder, Brueggemann & Clark

[57] ABSTRACT

A scanning confocal microscope scans a sample with an incident beam of radiation, in a raster scan pattern, causing the sample to fluoresce and emit visible radiation in at least two wavelengths. A portion of the fluorescent light retraces a portion of the path optical of incident beam, to a dichroic mirror that separates it from the incident beam for detection by a pair of photomultiplier tubes. A data processor accumulates digital data from the photomultiplier tubes to form a succession of image data frames of the sample being scanned, in the two wavelengths. Image data for a selected number of frames in each wavelength is averaged and then recorded on a single track of a recording system, in an alternating fashion with averaged data for the other wavelength. In addition, a ratio of the averaged data for the two wavelengths is delivered to a video display.

20 Claims, 8 Drawing Sheets

SCANNING CONFOCAL MICROSCOPE PROVIDING A CONTINUOUS DISPLAY

This invention was made with Government support under Grant No. BBS-8714246, awarded by the National Science Foundation. The Government has certain rights in this invention.

BACKGROUND OF THE INVENTION

1. Field of the Invention

The present invention relates generally to scanning confocal microscopes and, more particularly, to microscopes of this kind that process data acquired by scanning a sample with ultraviolet light and detecting the resulting fluorescence and that provide a continuous display of scan data.

2. Description of Related Art

In the scientific fields of physiology, cytobiology, etc., it is important to investigate the behavior of the intracellular ions of calcium, sodium, magnesium, etc. This is because these ions are thought to be closely linked with intracellular physioactivation. As part of a method of research into the behavior of the intracellular ions, fluorophores commonly are injected into cells. Such fluorophores combine uniquely with the certain species of ions within the cells and fluoresce when irradiated with excitation light of specified wavelength, visible or ultraviolet.

By way of example, fluorescent probes indo-1, fura-2, fluo-3 and rhod-2 are known fluorophores useful in the detection of the calcium ions. Any of these fluorescent probes can be used to detect the presence of calcium ions within the cells. For example, the probe indo-1 fluoresces at wavelengths of either 405 nanometers (nm) or 485 nm in accordance with the concentration of the calcium ions, in response to excitation by ultraviolet radiation having a wavelength of about 350 nm. The probe fura-2, on the other hand, fluoresces at a wavelength of about 500 nm, in response to excitation by ultraviolet radiation having a wavelength of about 340 nm or 380 nm.

When the fluorescent probe has combined with the calcium ions and is excited by the ultraviolet light, it fluoresces in an amount that varies in accordance with the calcium ion concentration. Therefore, the concentration of the calcium ions in each local area of a sample can be determined by measuring the intensity of the fluorescent light. The excitation and fluorescence detection can be carried out across sample surface, whereby a two-dimensional video image can be obtained. Further, a plurality of video images can be obtained in time series, whereby the time behavior of the ions can be investigated in detail.

Where the ratio between the intensities of the two peaks of the fluorescence spectra is detected under the ultraviolet excitation of the fluorescence probe indo-1, or where the ratio between the intensities of the respective peaks of the fluorescence spectra is detected under the alternate excitation operations of the fluorescent probe fura-2 with the two wavelengths of ultraviolet radiation, an accurate measurement of calcium ion concentration can be reliably obtained.

One suitable confocal microscope for scanning a sample detecting the resulting fluorescence is disclosed in copending and commonly-assigned U.S. patent application Ser. No. 07/862,633, filed Apr. 1, 1992 and entitled "Scanning Confocal Microscope." The disclosed microscope produces sets of digital data words that represent a succession of two-dimensional images of the sample in the two fluorescent wavelengths.

The scanning confocal microscope disclosed in the copending application is highly effective in generating data representing images of a sample's fluorescence. However, there still is a need for a scanning confocal microscope of this kind that further includes a processor for appropriately processing and transforming the data into a format that optimally conveys pertinent dynamic information about the sample and allows the user to selectively manipulate the data to accommodate the need for specific information. The present invention fulfills this need.

SUMMARY OF THE INVENTION

The present invention is embodied in a confocal microscope for scanning a sample doped with a predetermined fluorescent indicator, the microscope having a data processor for providing an operator-selected processing of detected fluorescence data so as to record and display selected information about the sample. A scanner repeatedly scans a laser beam across the sample in two dimensions, whereupon the sample fluoresces in at least first and second predetermined wavelengths, and detectors detect light emitted by the sample in these wavelengths and generate raw image data representing a sequence of related pairs of two-dimensional images of the sample. The processor then averages the raw image data produced for a selected number of successive images in each of the two fluorescence wavelengths. This produces a succession of related pairs of average image data, which are recorded in an alternating sequence in a single track of a permanent data storage device. Averaging the data in this way enables noise to be reduced and acuity to be enhanced.

The data processor of the confocal microscope further includes a device for ratioing the average image data for each related pair of images, to produce a sequence of ratioed images that are substantially insensitive to any variations in the intensity of the scanning beam or in the local concentration of the fluorescent indicator. These ratioed images can be selectively displayed on a video display. Allowing the operator to select the number of successive images to be averaged enables him or her to tailor the processor to optimize the visualization of dynamic information for the particular sample being scanned.

The video display provides a continuously updated display of the ratioed images, and the displayed images reflect all of the data that is incorporated into the average image data. Thus, no data generated by the detectors is lost or goes unused while earlier data is being processed for storage and/or display.

The confocal microscope of the invention includes just three frame memories, including two used to accumulate running sums for use in generating average image data for the two wavelengths and one used to generate the ratio data. One of the two frame memories used for accumulating running sums provides a second function of storing average image data for one frame time, during which time the memory otherwise would be unused. This allows the average image data for the two wavelengths to be recorded in the permanent data storage device in an alternating fashion.

Other features and advantages of the present invention should become apparent from the following description of the preferred embodiment, taken in con-

DESCRIPTION OF THE PREFERRED EMBODIMENTS

Figure 1:
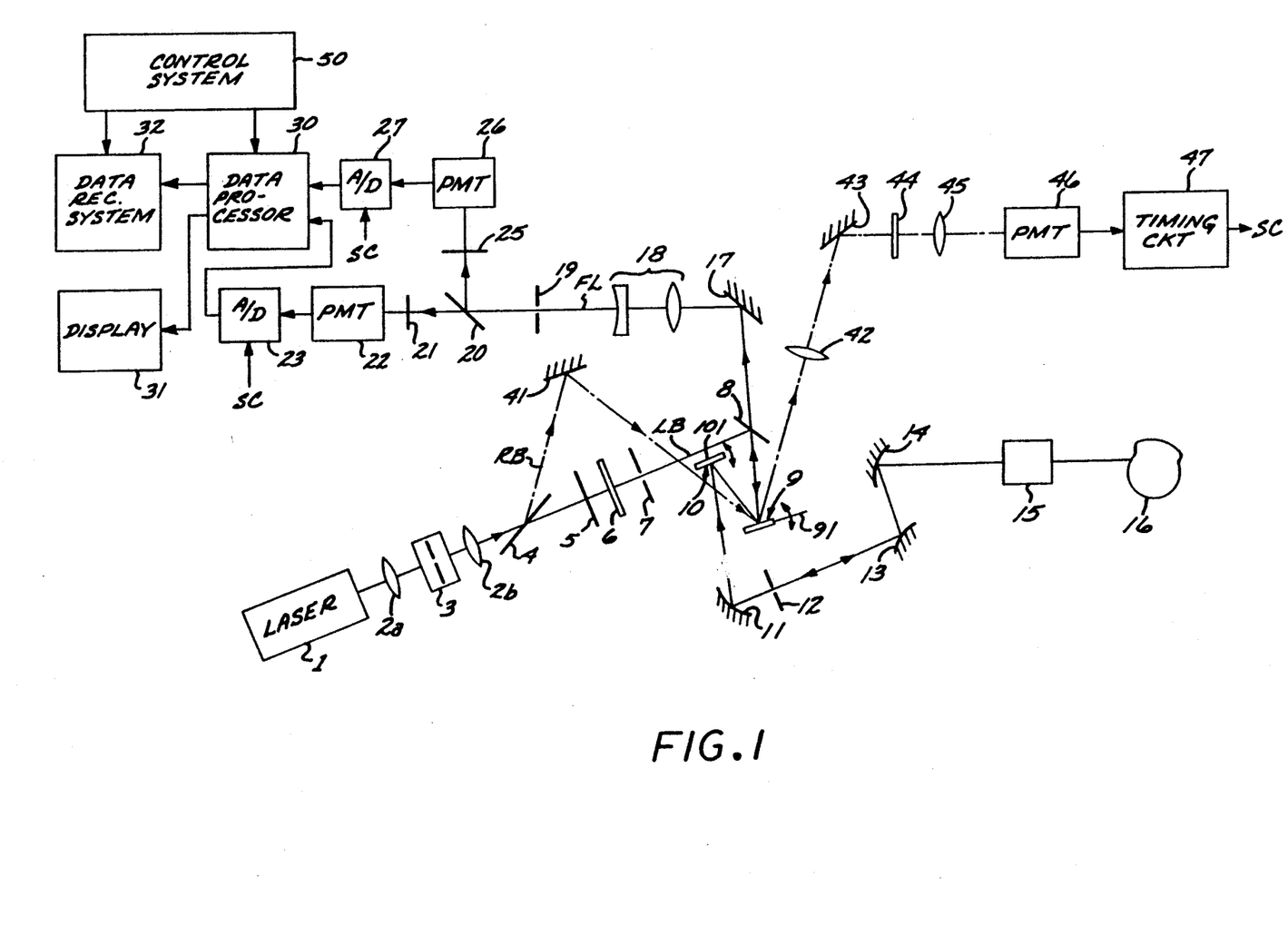
FIG. 1 is a schematic diagram of a scanning confocal microscope in accordance with the present invention.

With reference now to the drawings, and particularly to FIG. 1, there is shown a scanning confocal microscope adapted to scan a sample 16 and measure calcium ion concentration within the sample, which is doped with a fluorescent probe such as indo-1. The optical portion of this microscope is disclosed in detail in copending and commonly-assigned application for U.S. patent, Ser. No. 07/862,633, filed Apr. 1, 1992 and entitled "Scanning Confocal Microscope." That copending application is incorporated by reference.

In FIG. 1, a laser light source 1 emits a collimated beam LB of ultraviolet radiation having a wavelength of 351 nanometers (nm), which is expanded by a beam expander that includes convex lenses 2a and 2b. The laser beam passes through a spatial filter, such as pinhole diaphragm 3 interposed between the convex lenses 2a and 2b, and thereafter passes through a beam splitter 4, a shutter 5, an optical attenuator 6, and an aperture 7, finally reaching a primary dichroic mirror 8. The laser beam LB is reflected by the dichroic mirror 8 and then scanned in two dimensions by a horizontal scanning mirror 9 and a vertical scanning mirror 10. The scanning beam is then introduced into a microscope objective 15 via a reflection-type relaying optical system, which includes concave mirrors 11 and 14 and a convex mirror 13. A view iris 12 disposed between the mirrors 11 and 13 limits the observation area of the sample.

The microscope objective 15 has a focusing performance with aberrations corrected for ultraviolet and visible light, as is incorporated into ordinary optical microscopes. The laser beam LB from the relaying optical system is condensed onto the sample 16 by the objective 15, and the beam scans the sample 16 in two dimensions by operation of the two scanning mirrors 9 and 10. The horizontal scanning mirror 9 is a high-speed galvanometer scanner, which is vibrated at its resonant frequency about an axis of rotation 91 perpendicular to the sheet of the drawing. The mirror 9 resonates in response to a sinusoidal input signal having a frequency of about 8 kHz. The vertical scanning mirror 10, on the other hand, is a low-speed galvanometer scanner. In order to realize the standard interlaced scanning of an NTSC system, the mirror 10 is vibrated about an axis of rotation 101 parallel with the sheet of the drawing and in response to a sawtooth waveform having a frequency of about 60 Hz, which is equal to the field rate of a standard NTSC video signal.

When the fluorescence probe added in the sample 16 is irradiated with the scanning laser beam LB, it fluoresces with a wavelength characteristic according to the extent of the calcium ion concentration. When the fluorescent probe indo-1 is used as a fluorophore, the spectrum of the emanated fluorescence has wavelength peaks at 405 nm and 485 nm. It will be appreciated that other fluorescent probes could alternatively be used, for measuring the concentration of calcium or other ion in the sample 16. In each case, the ratio of intensities in the two fluorescent wavelengths represents a measure of such ion concentration.

A portion of the fluorescent emissions is directed outwardly and condensed by the microscope objective 15, after which it retraces the same path as that of the incident laser beam LB and passes through the primary dichroic mirror 8. Subsequently, the fluorescence beam FL is reflected by a reflector 17 and guided by a condensing lens system 18 to a pinhole diaphragm 19.

After passing through the pinhole diaphragm, the fluorescence beam FL is separated by a secondary dichroic mirror 20 into a first wavelength component that includes the wavelength 405 nm and a second wavelength component that includes the wavelength 485 nm. One of the separated fluorescence components is passed through a filter 21 and detected by a photomultiplier tube (PMT) 22, while the other fluorescence component is passed through a filter 25 and detected by a PMT 26. The outputs of the respective PMTs 25 and 26 are digitized by analog-to-digital (A/D) converter circuits 23 and 27, in response to a sampling clock SC to be described below. The resulting digital data words are stored as video data in frame memories included in a data processor 30. The stored video data is selectively displayed on a color video display unit 31 and stored in a data recording system 32.

Figure 2:
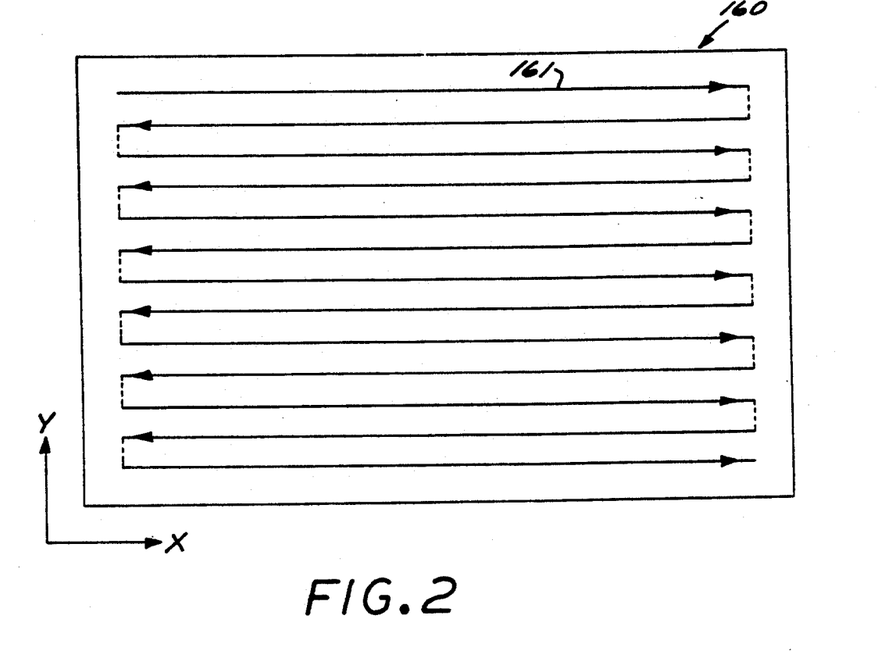
FIG. 2 is a view of the local scanning area of a sample being scanned by the scanning confocal microscope of FIG. 1.

As shown in FIG. 2, the incident laser beam LB reflected by the respective horizontal and vertical scanning mirrors 9 and 10 raster-scans the local scanning area 160 of the sample 16, along scanning lines 161. The depicted scanning pattern is formed by a combination of the shifts of scanning positions in a Y-direction effected by the vertical scanning mirror 10 and the reciprocative scanning in an X-direction effected by the horizontal scanning mirror 9. The local scanning area 160 can be scanned at a standard NTSC line frequency of 15.75 kHz on the basis of the reciprocative raster scanning in the illustrated scanning pattern. As a result, the video image of the sample can be formed at a video rate of 30 frames/sec.

A reference beam RB for monitoring the vibrations of the horizontal scanning mirror 9 is utilized in order to generate the sampling clock SC mentioned above. Referring back to FIG. 1, the reference beam RB is produced by the beam splitter 4, which reflects part of the laser beam LB to a mirror 41, which in turn reflects the beam toward the horizontal scanning mirror 9. The reference beam RB and the laser beam LB impinge on an identical point on the scanning mirror 9, whereby the two beams are deflected by equal amounts, regardless of any mechanical distortion of the mirror. To prevent the reference beam RB from interfering with the vertical scanning mirror 10, it impinges on the horizontal scanning mirror 9 at an incidence angle different from that of the laser beam LB. The reference beam RB reflected by the horizontal scanning mirror 9 is condensed by an f8 lens 42 and reflected by a mirror 43 to form a beam spot on a Ronchi grating 44.

Figure 3:
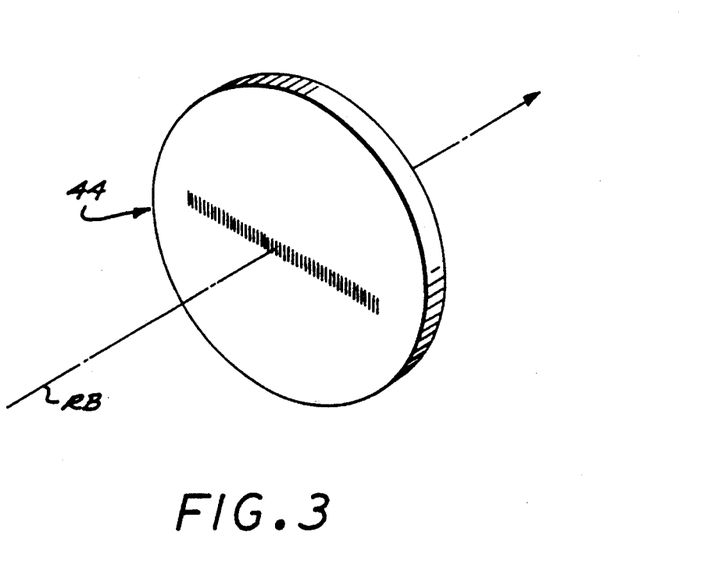
FIG. 3 is a perspective view of the Ronchi grating included in the scanning confocal microscope of FIG. 1.

As shown in FIG. 3, the Ronchi grating 44 has alternating transparent and opaque regions on a transparent glass baseplate. The transparent and opaque regions are of equal width. Alternatively, the grating has light-transmitting recurrent regions provided at equal intervals on a glass baseplate covered with an opaque film. The spot of the reference beam RB reciprocatingly scans the surface of the Ronchi grating 44 along the direction of the alternating regions in response to the vibrations of the horizontal scanning mirror 9.

The reference beam RB transmitted through the Ronchi grating 44 is collected by a condensing lens 45 and then detected by a PMT 46. The condensing lens preferably is spaced from the Ronchi grating such that the beam always impinges on the same portion of the PMT 46, regardless of its position on the Ronchi grating. As a result, the reference beam RB is detected without being affected by any nonuniform spatial sensitivity of the PMT. The signal output by the PMT is provided to a timing circuit 47, to generate the sampling clock SC.

The timing of the data sampling operations in the A/D converter circuits 23 and 27 now will be explained. As stated above, the horizontal scanning mirror 9 is driven in response to a sinusoidal input signal. The positional variation of the mirror 9 in its widthwise direction per unit time therefore is larger near the center of the vibrations and smaller near the two ends of the vibrations. Accordingly, the incident laser beam LB scanning the surface of the sample 16 has a scanning speed that is fastest near the middle of each scanning line 161 (see FIG. 2) and slowest near the two ends of each scanning line. Therefore, to obtain a distortionless video image, it is necessary to execute the data sampling operations in the A/D converter circuits 23 and 27 at temporally unequal intervals conforming to such a scanning characteristic.

As previously mentioned, the Ronchi grating 44 includes an alternating sequence of transparent and opaque regions, of equal and uniform widths. The spot of the reference beam RB has a diameter comparable to such widths. Consequently, the signal output by the PMT 46 is a clipped sine wave having a frequency that varies from a high value when the beam scans a midpoint of the grating to a low value when the beam scans either end of the grating.

The timing circuit 47 (FIG. 1) high-pass filters the output signal from the PMT 46, to remove dc and various low-frequency components, and compares the filtered signal with a threshold. A clock signal SC including a short, fixed-length pulse for each detected crossing of the threshold is then generated, for use in clocking the two PMTs 22 and 26. Thus, two clock pulses are generated for each transparent region of the Ronchi grating, and clocking is more consistent for the two opposite scan directions.

It will be appreciated that each pulse in the clock signal SC represents movement of the scanning reference beam RB, and therefore the incident laser beam LB, by a fixed amount corresponding to the spacing of the opaque regions in the Ronchi grating 44. The sampling of the PMTs 22 and 26 thereby generates data representative of linear scans of the sample 16, despite the use of a scanning mirror 9 that scans in a non-linear, sinusoidal fashion.

Figure 4:
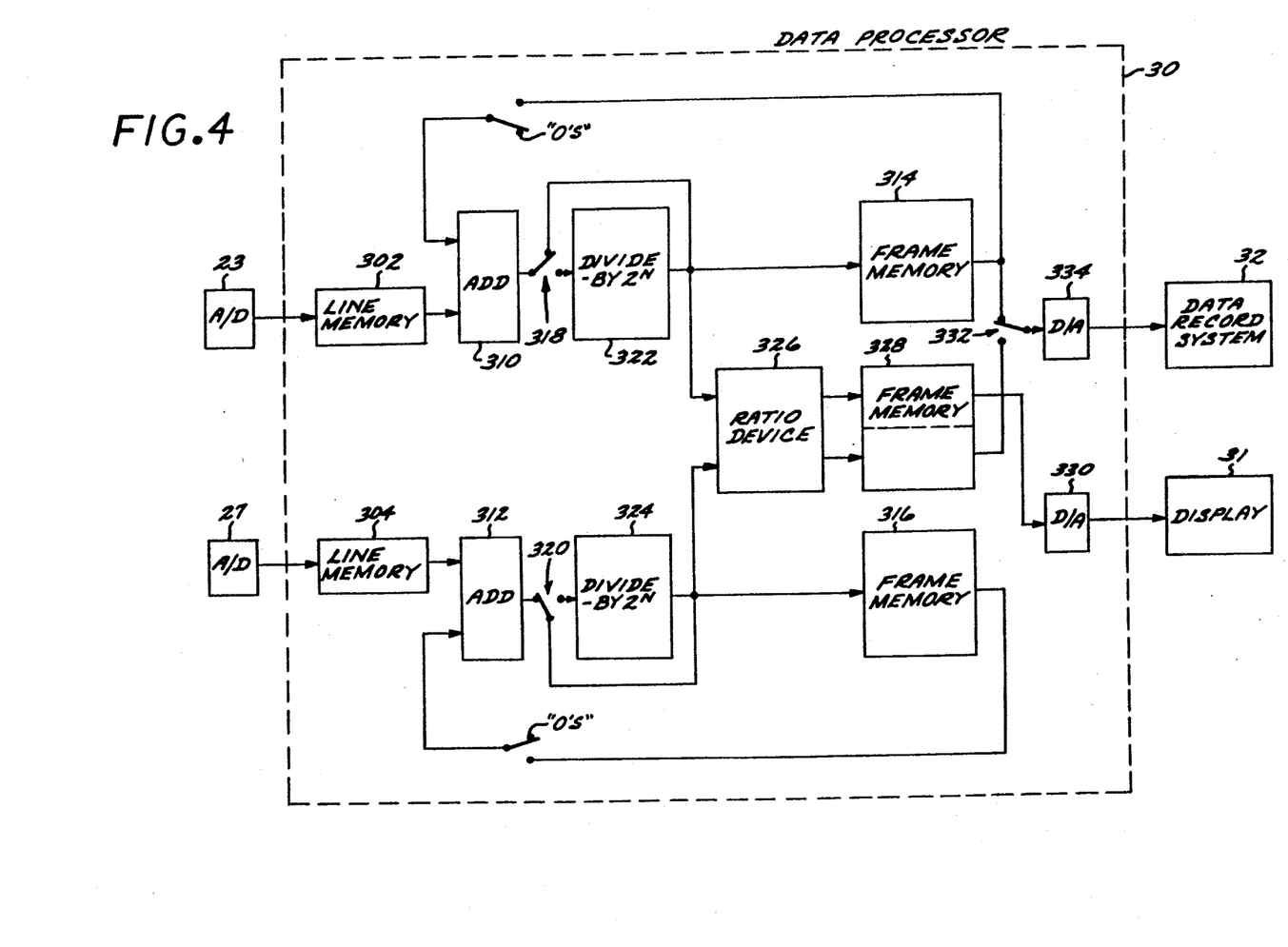
FIG. 4 is a simplified block diagram of the data processor portion of the scanning confocal microscope of FIG. 1.
Figure 5:
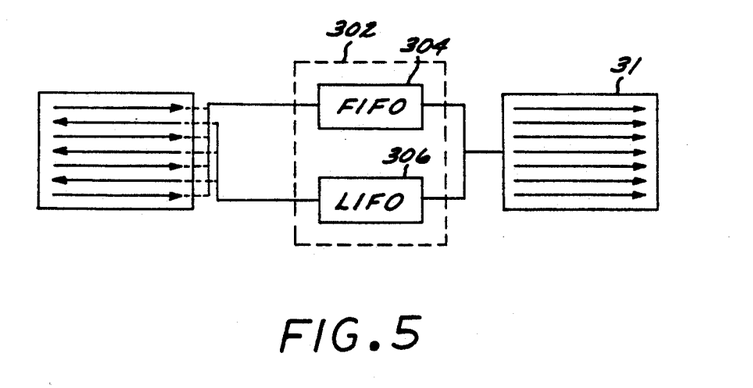
FIG. 5 is a schematic block diagram of the arrangement of line memories for accumulating video data.

The data processor 30 of the scanning confocal microscope is shown in greater detail in FIG. 4. Image data is supplied to the data processor from the A/D converters 23 and 27, and it is input into memories 302 and 304, respectively. Because the image data represents a reciprocative raster scanning, as shown in FIG. 2, it needs to be converted into a standard NTSC format. To this end, the two memories 302 and 304 each include two kinds of line memories, as shown in FIG. 5. A first line memory 306 is a first-in, first-out (FIFO) memory, into which is written the succession of image data words acquired when scanning the odd-numbered scanning lines. A second line memory 308 is a last-in, first-out (LIFO) memory, into which is written the succession of image data words produced when scanning the even-numbered scanning lines. The two line memories 306 and 308 therefore output data following a standard NTSC-scan pattern, with a succession of left-to-right scans.

With reference again to FIG. 4, the data processor 30 is shown to include adders 310 and 312, in the form of arithmetic and logic units, for adding together the succession of data words received from the respective memories 302 and 304 with a succession of data words received from 16-bit deep frame memories 314 and 316, respectively. The successive data words output by the adders 310 and 312 are supplied through switches 318 and 320 as inputs to the respective frame memories 314 and 316. Thus, for a first set of switch positions, the frame memories accumulate a summation of data words for a succession of image frames, until they are reset by a reset signal.

A second set of positions for the switches 318 and 320 couple the successive data words output by the adders 310 and 312 to divide-by-$2^N$ devices 322 and 324, respectively. The integer $2^N$ is selected to correspond to the number of frames whose data is being added and stored in the frame memories 314 and 316. When the switches are in their second positions, the divide-by-$2^N$ devices therefore output a succession of data words that represent the average pixel values for those N frames. When $N=2$, the divide-by-$2^N$ devices can each constitute a straightforward 1-bit shift register.

The data processor 30 further includes a ratio device 326 in the form of a 16-bit by 16-bit look-up table, for computing the ratio of the successive averaged data words output by the two divide-by-$2^N$ devices 322 and 324. These ratios are expressive of the concentrations of calcium ions in the sample 16 being scanned and are substantially insensitive to variations in the intensity of the scanning beam LB or to variations in the transmittance of the various optical components. The computed ratios are supplied as 8-bit words to one half of a 16-bit, bifurcated frame memory 328, for intermediate storage. From there, the 8-bit words are supplied to a digital-to-analog (D/A) converter 330 and to the color video display 31.

Thus, the data processor 30 includes three frame memories, each 16 bits deep, identified by the reference numerals 314, 316 and 328. In each case, stored data for each pixel is read out immediately before new data is written for that pixel. Therefore, each memory reads out what was written into it during the previous frame, then accepts the new input for the current frame. In an alternative mode, each frame can be frozen during any given frame, i.e., prevented from accepting any further input data. The frame memories 314 and 316 are associated with the adders 310 and 312, respectively, and they store accumulations of the summed data for up to $2^N$ frames, where N is any selected integer up to 8.

The frame memory 328 is bifurcated such that one half of it stores a single frame of ratio data representing the ratio of the average pixel values for blocks of $2^N$ frames in the two fluorescence wavelengths. The remaining half of the bifurcated frame memory 328 is used to record 8 bits each of the successive 16-bit words output by the divide-by-$2^N$ circuit 324, representing average pixel values for the second fluorescence wavelength. This stored data, along with the corresponding data for the first fluorescence wavelength, supplied by the frame memory 314, are provided to a switch 332 and, in turn, to a D/A converter 334. The switch is made to change between its two positions once each frame time. The resulting analog data can then be recorded in the data recording system 32, which can take the form, for example, of an optical disc recorder. The use of just a single recorder for both constituent wavelengths is desirable, both for economy and to ensure that the data representing both images are kept together.

It should be noted that it is the average pixel values for the first and second fluorescence wavelengths, not the ratios of such values, that are recorded in the data recording system 32. This is done for several reasons. First, the average values $<N1+N2>$ and $<D1+D2>$ are not necessarily perfect measures of average pixel intensities, because they fail to incorporate baseline levels N0 and N1 corresponding to the outputs of the detectors 26 and 27 in the absence of the fluorescent probe. Such baseline levels sometimes are not available until the scanning of the sample 16 has been concluded, so in order to incorporate them into the desired ratio formula, i.e., $[<N1+N2>-N0]/[<D1+D2>-D0]$, it is necessary to preserve the values $<N1+N2>$ and $<D1+D2>$.

Second, 8-bit integers and analog video optical disc recorders can represent only a limited range of ratios, and the operator often does not know in advance the range of ratios that will be obtained. Storing the raw numerators and dominators permits the operator to properly scale the two values relative to each other so as to select the proper range of encodable ratios and not lose pertinent information.

Third, video optical disc recorders generally do not playback exactly the same values previously received for recording, but rather a linear transformation of it, i.e., "Playback Value=A x (Input Value)+B," where A and B are constants. If ratios were being recorded, the constants A and B would have to be known. However, so long as A and B remain stable during the recording of the 1 various numerators, e.g., $<N1+N2>$, and denominators, e.g., $<D1+D2>$, and during the recording of the baseline values N0 and D0, then A and B will cancel out when the final ratio formula $[<N1+N2>-N0]/[<D1+D2>-D0]$ is calculated based on the playback values. Consequently, the values of A and B need not be known.

Operation of the data processor 30 will now be described with reference to FIG. 6 and FIGS. 7A-7D. These figures depict operation of the data processor for the special case in which N is selected to be the integer 1, meaning that the data words for two successive image frames are averaged together. It will be appreciated that integers other than 1 alternatively could be selected.

Figure 6:
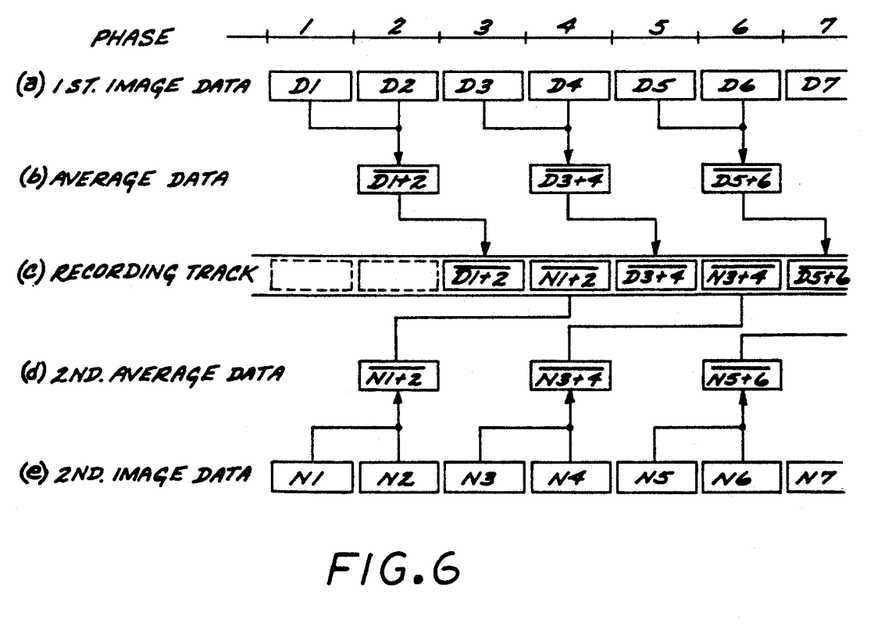
FIG. 6 is a schematic time chart showing the arrangement of image data being averaged and recorded by the data processor of FIG. 4.

FIG. 6 is a time chart illustrating in line (a) the succession of the image data frames D1, D2, ... from the line memory 302, which correspond to the first fluorescence wavelength, and illustrating in line (e) the succession of image data frames N1, N2, ... from the line memory 304, which correspond to the second fluorescence wavelength. The average data output by the divide-by-$2^N$ device 322 is shown in line (b), with each frame of average data being output by the divide-by-$2^N$ device within the last (in this case the second) of the two frames being averaged. Similarly, in line (d), the average data output by the divide-by-$2^N$ device 324 is shown, with each frame of data being output simultaneous with the second of the two frames being averaged. It thus will be appreciated that each pair of corresponding average data frames represents fluorescence images occurring simultaneously in the sample 16. Since a ratio is to be computed of the two frames of average data, it is important that they represent simultaneous images in the two fluorescence wavelengths.

Line (c) of FIG. 6 represents the timing of the recording of the ratio data on a recording track in the data recording system 32. Each frame of average data for the first fluorescence wavelength is recorded on the track one frame time after its generation. This time delay is provided by the memory 314. Conversely, the frame of average data for the second fluorescence wavelength is recorded on the track two frame times after its generation. This time delay is provided by the frame memory 328.

The data processor 30 thus undergoes four separate phases of operation, each having a duration of one frame time, i.e., 1/30 second. The flow of data in these four phases is depicted in FIGS. 7A-7D. In all of the phases, the various components of the data processor are controlled in synchronism with the sampling clock SC of the timing circuit 47, under commands from the control system 50 (FIG. 1).

Figure 7A:
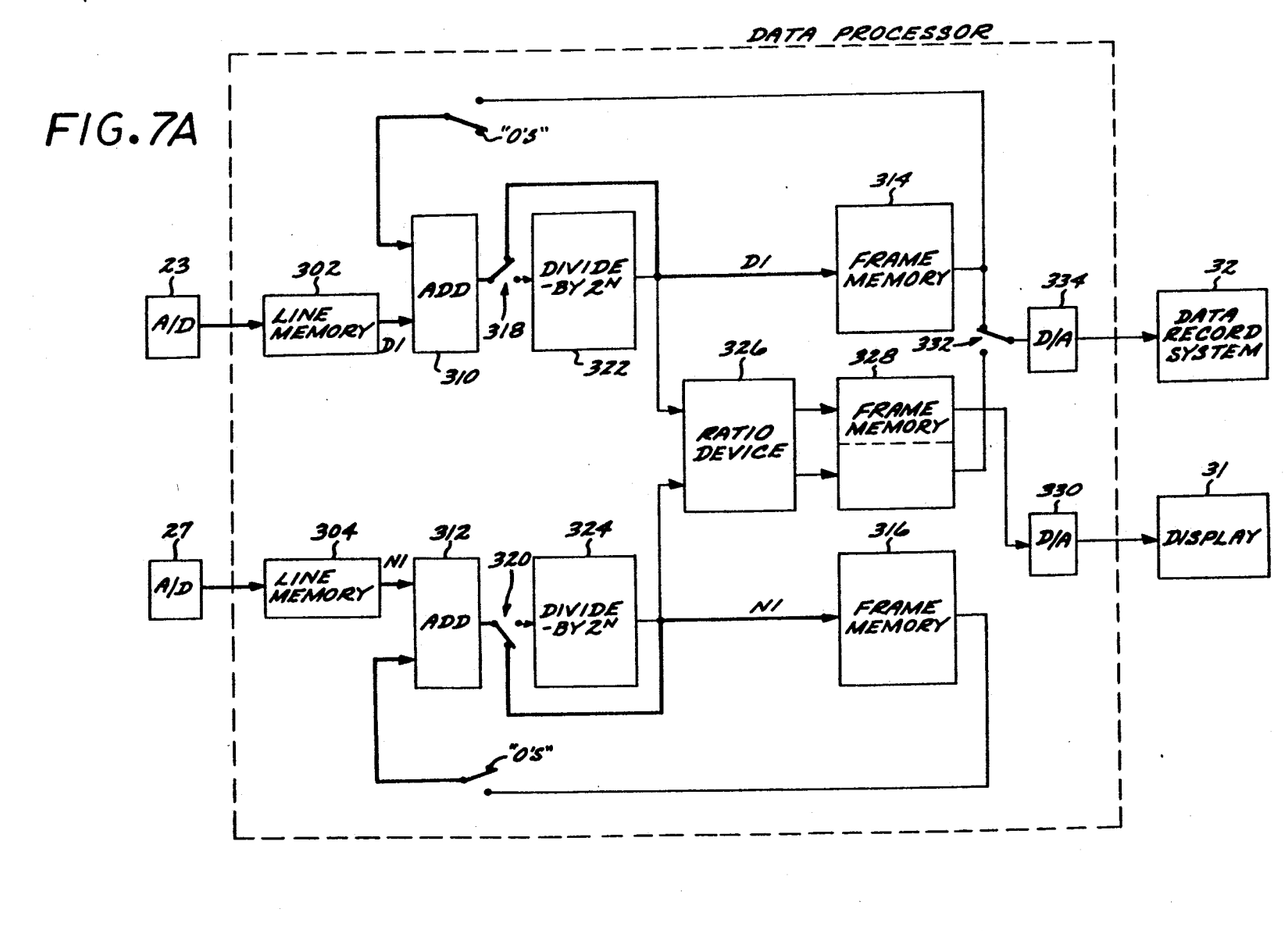
FIGS. 7A-7D are simplified versions of the data processor of FIG. 4, showing the signal paths that are followed during four separate phases of the processor's operation.

In phase 1, which is illustrated in FIG. 7A, the first image data D1 for the first frame is received from the line memory 302 and written into the frame memory 314 after passing through the adder 310. At the same time, the image data N1 for the first frame is received from the line memory 304 and written into the frame memory 316 after passing through the adder 312.

Figure 7B:
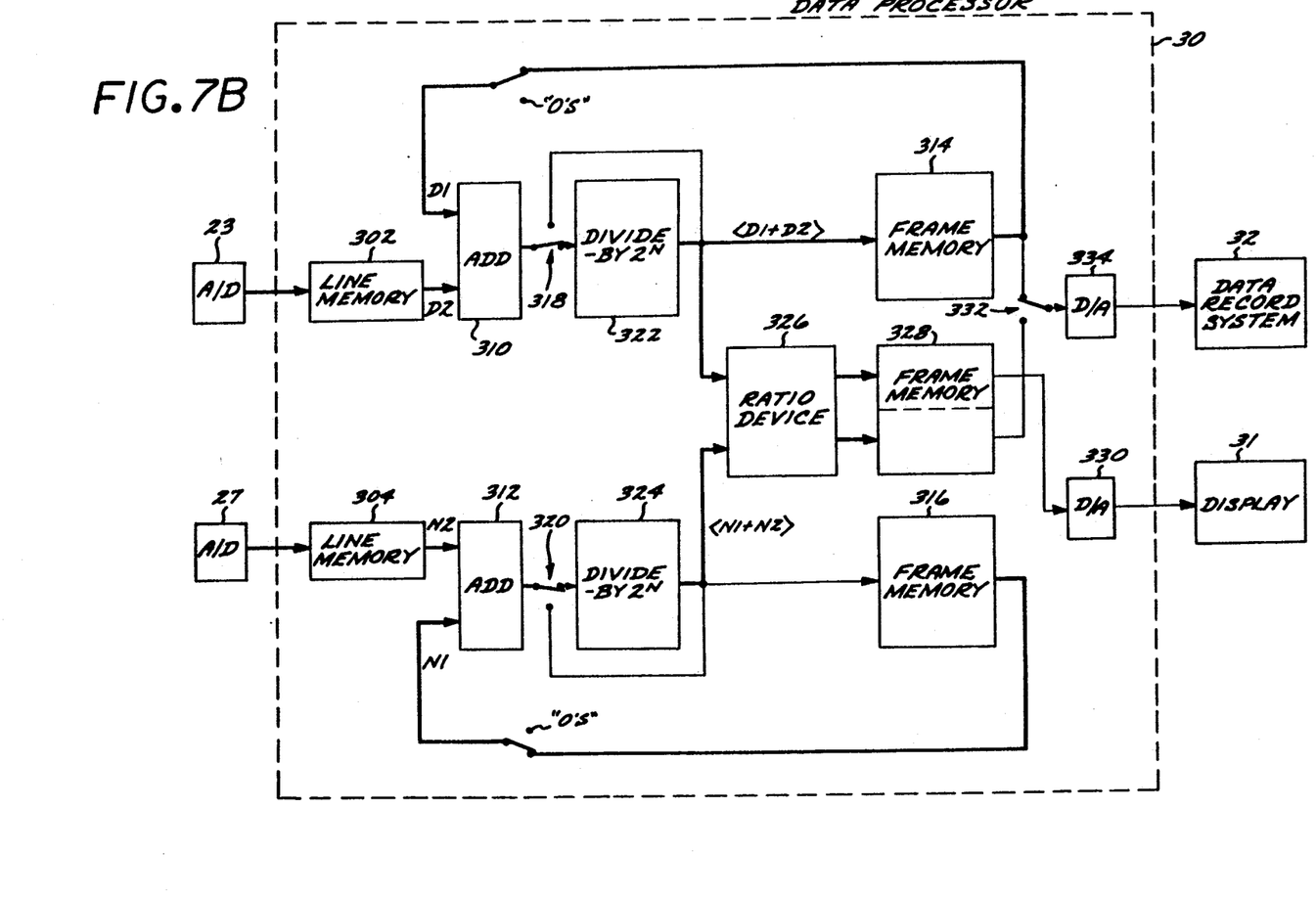

In phase 2, illustrated in FIG. 7B, the adders 310 and 312 are respectively supplied with the image data D2 and N2 for the second frame. The adder 310 generates the added data D1+D2 from the supplied image data D2 and the image data D1 read from the frame memory 314, and the divide-by-$2^N$ (i.e., divide-by-2) device 322 delivers the average data $<D1+D2>$ to the ratio device 326. Simultaneously, the adder 312 generates the added data N1+N2 from the supplied image data N2 and the image data N1 read from the frame memory 316, and the divide-by-$2^N$ (i.e., divide-by-2) device 324 delivers the average data $<N1+N2>$ to the ratio device. The ratio device, in turn, computes the ratio of the individual data words, i.e., $<N1+N2>/<D1+D2>$. These ratios are indicators of the calcium ion concentration in the sample 16 being scanned. The ratio data is saved in one half of the bifurcated frame memory 328.

Also in phase 2, the average data words $<D1+D2>$ and $<N1+N2>$ are stored for later recording (during the next two phases) in the data recording system 312. In particular, the average data word $<D1+D2>$ is stored in the frame memory 314, while the average data word <N1+N2> is stored in one half of the bifurcated frame memory 328. In both cases, each data word is entered into the memory immediately after the word previously stored in its intended memory location is read out.

The frame memory 314 thus serves two distinct functions, the first being to store a running sum of the incoming data words for the first wavelength, and the second being to store the average data word for the first wavelength. The latter function is provided during the particular frame time in each cycle when a running sum of incoming data words is not required.

Figure 7C:
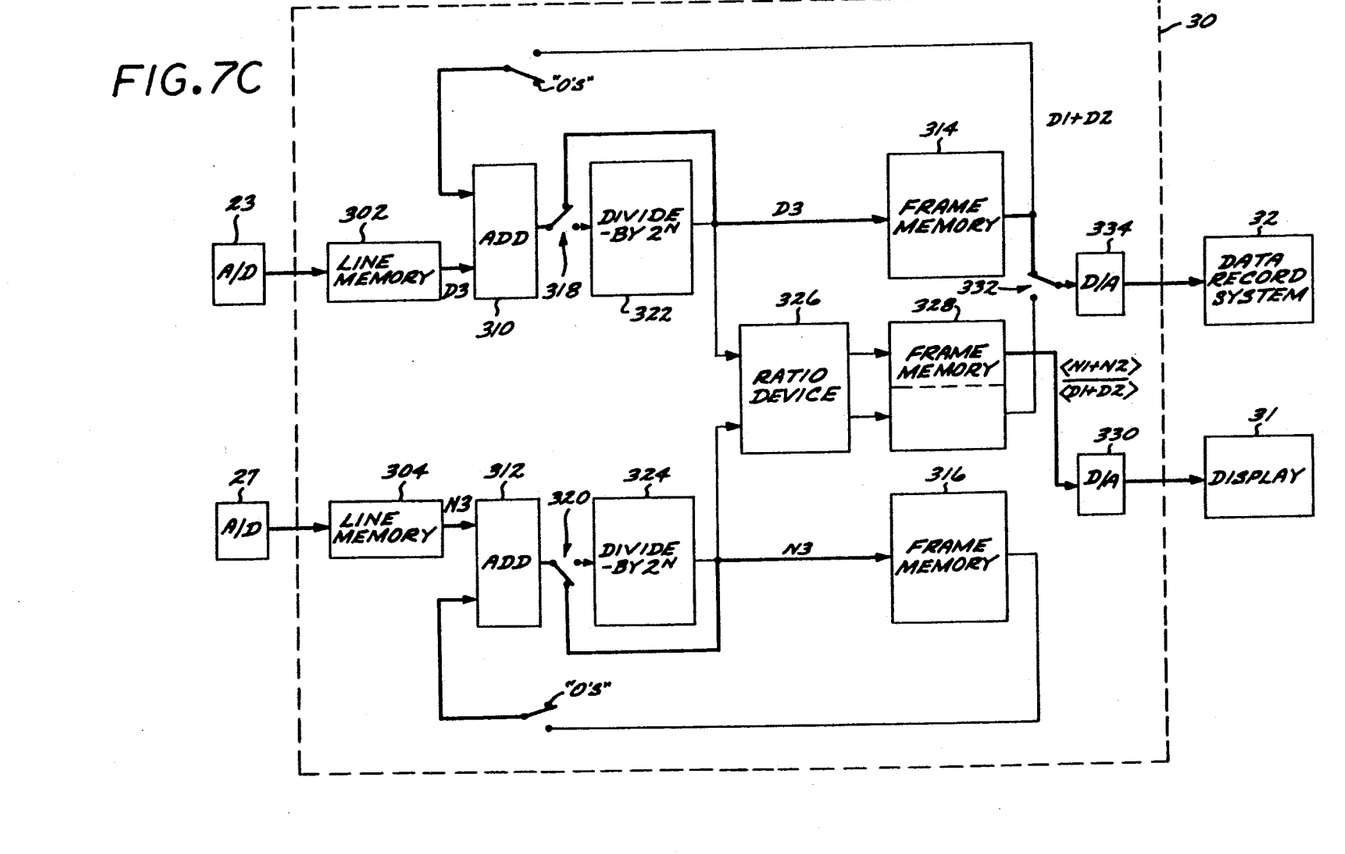

In phase 3, illustrated in FIG. 7C, the ratio data <N1+N2>/<D1+D2> currently saved in the frame memory 328 is supplied to the D/A converter 330 and, in turn, to the color video display 31. A special pseudo-color image of the scanned sample 16 thereby is provided. At the same time, the average data <D1+D2> currently saved in the frame memory 314 is supplied through the switch 332 to the D/A converter 334 and, in turn, is written onto a recording track of the data recording system 32. During this same time period, the adders 310 and 312 are respectively supplied with the next image data D3 and N3. In the same manner as in phase 1, the data D3 is saved in the frame memory 314, and the data N3 is saved in the frame memory 316.

Figure 7D:
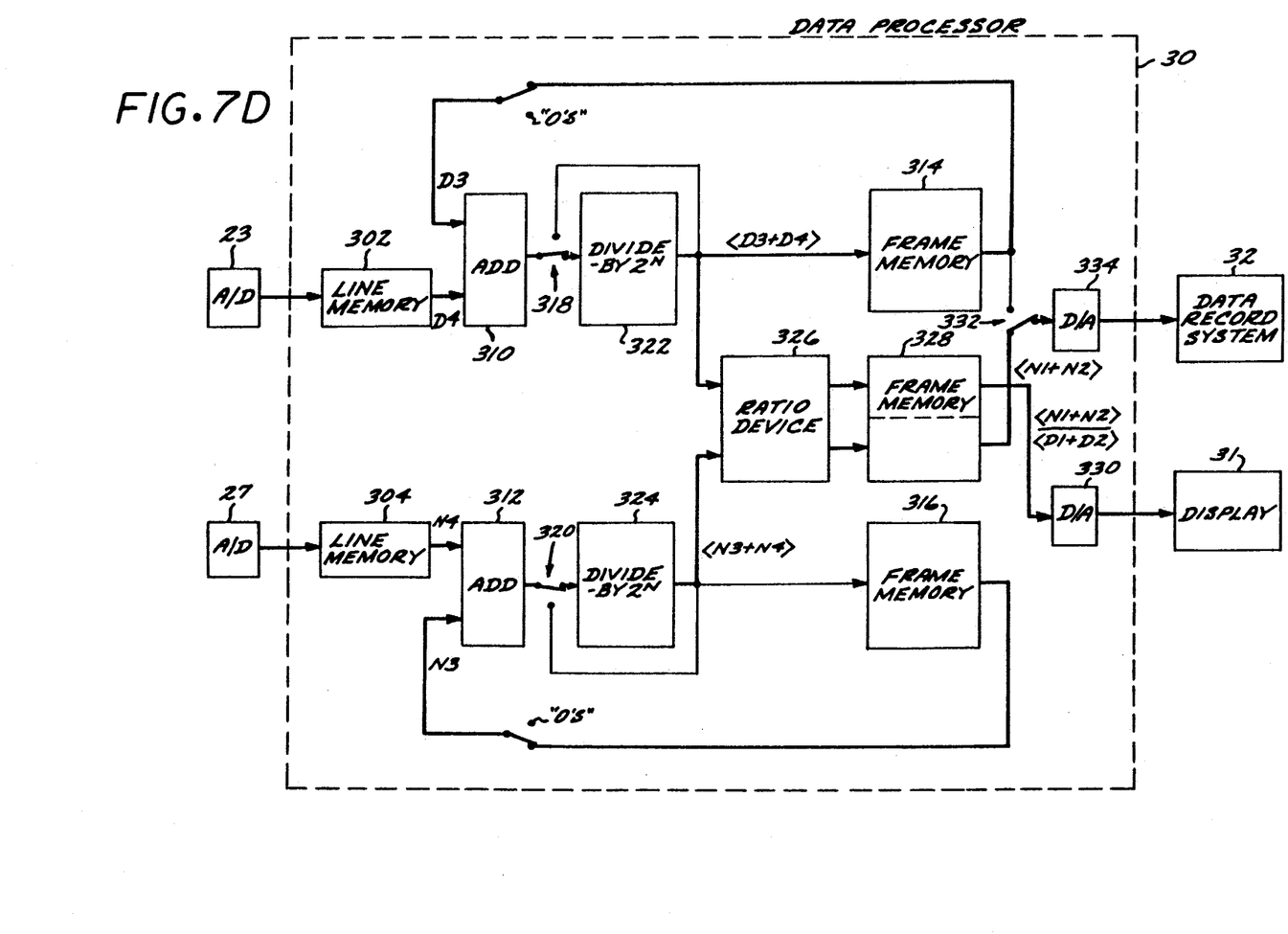

In phase 4, illustrated in FIG. 7D, the ratio image derived from the ratio data <N1+N2>/<D1+D2> continues to be displayed on the display unit 31 while the next image data D4 supplied to the adder 310 is added with the image data D3 currently saved in the frame memory 314. The resulting sum is divided by 2 in the divide-by-$2^N$ device 322, in the same manner as in the phase 2. The average data <D3+D4> thus obtained is supplied to the frame memory 314. This average data <D3+D4> also is input to the ratio device 326.

Similarly, the image data N4 supplied to the adder 312 is added with the image data N3 currently saved in the frame memory 316, and the resulting sum is divided by 2 in the divide-by-$2^N$ device 324 The average data <N3+N4> thus obtained is input to the ratio device 326. The ratio device computes the ratio of the individual data words <N3+N4>/<D3+D4>, which are indicators of the calcium ion concentration in the sample 16 being scanned. This ratio data is saved in the frame memory 328.

Also in phase 4, the average data <N1+N2> is supplied from the frame memory 328 through the switch 332 to the D/A converter 334 and, in turn, is written onto the recording track of the data recording system 32. The average data <N3+N4> is written into the memory 328 as the average data <N1+N2> is being read out.

By repeating operations similar to the phases 3 and 4 described above, the ratio images of the first and second fluorescence wavelengths are displayed in real time on the video display 31. In addition, the average data based on the first fluorescence wavelength and the average data based on the second fluorescence wavelength are recorded on a single recording track of the data recording system 32, in an alternating fashion. In the embodiment just described, averaged denominators (e.g., <D1+D2>) are stored before averaged numerators (e.g., <N1+N2>), although this order is arbitrary and could easily be reversed by reprogramming the look-up table that constitutes the ratio device 326.

It will be appreciated that the confocal microscope of the invention is configured to provide a continuous display of the current image data ratios on the display 31. The displayed frame is repeatedly updated as each new frame of image data ratios becomes available. It also will be appreciated that the microscope scans the sample 16 continuously and that all of the resulting scan data is saved. This data is used both in the continuous display of image data ratios and in the computing of average data for permanent storage in the videodisc recorder 32. This feature ensures that the sample's dynamic behavior is captured in its entirety.

The embodiment described above has exemplified the case where the average image data for two successive frames are recorded on the recording track. Alternatively, it is also possible to record the average data of a predetermined number of successive frames, e.g., 4 frames, 8 frames, or 16 frames, in each case the average data of the first fluorescence wavelength alternating with the average data of the second fluorescence wavelength.

When the integer N is selected to be 2 or more, in which case four or more frames are to be averaged, then operation of the data processor 30 differs in two respects from that described above. First, during some time frames, data is added without dividing by $2^N$. Second, during other frames, data is not being recorded.

More particularly, when the integer N is selected to be 2 or more, the operations during the first frame of each acquisition cycle would remain the same as in FIGS. 7A and 7C. During the second through the $(2^N-1)$th frames, the running sums contained in frame memories 314 and 316 would be fed back to the respective adders 310 and 312, to be summed with the incoming new data, while the switches 318 and 320 would be set to bypass the divide-by-$2^N$ devices 322 and 324. During the final i.e., $2^N$th frame, the switches 318 and 320 would be reset to pass the final sum through the divide-by-$2^N$ devices 322 and 324. The averaged image at the first wavelength to be recorded, from frame memory 314, is always sent to the data recorder 32 during the first complete frame after the average was computed, which will normally be the first frame of the subsequent acquisition cycle. The averaged image at the second wavelength to be recorded, from the lower half of frame memory 328, is always sent to the data recorder 32 during the next complete frame, which will normally be the second frame of the subsequent acquisition cycle. During the remaining $(2^N-2)$ frames of that subsequent acquisition cycle, data will not be recorded in the recorder.

In an alternative embodiment of the invention, 30 ratio pairs per second are recorded, again using just a single optical disc recorder, by recording fields of data rather than frames of data. Vertical interlacing of the alternative fields is ignored. Thus, <N1+N2> and <D1+D2> would each refer to two video fields averaged together. Each would be stored in the recorder as a field of a single frame, and each would include only half the number of lines of a normal frame. This sacrifices vertical resolution, but nevertheless is equivalent to local spatial averaging, improving the signal-to-noise ratio by a factor of the square root of 2.

In another variation, the ratio device 340 can be configured to pass through either the average data for the first fluorescence wavelength or the average data for the second fluorescence wavelength. In this way, images of the sample in either the first wavelength or the second wavelength can be displayed on the video display 31.

Although the invention has been described in detail with reference only to the preferred embodiment, those skilled in the art will appreciate that various modifications can be made without departing from the invention. Accordingly, the invention is defined only with reference to the following claims.

I claim:

1. A confocal microscope for scanning a sample doped with a predetermined fluorescent indicator, comprising:

a scanner for repeatedly scanning a laser beam in two dimensions across the sample, whereupon the sample fluoresces in first and second predetermined wavelengths;

first and second detectors for detecting light emitted by the sample in the first and second wavelengths and for generating a succession of frames of image data representing a sequence of related pairs of simultaneous two-dimensional images of the sample, in the first and second wavelengths;

first and second frame memories for temporarily storing individual frames of image data for the respective first and second wavelengths;

a permanent data storage device;

transfer means for transferring image data derived from the data generated by the first and second detectors to the permanent data storage device in an alternating fashion;

ratio means for repeatedly computing and temporarily storing the ratio of image data for the respective first and second wavelengths, to produce a sequence of image data ratios; and video means for receiving the sequence of image data ratios produced by the ratio means and providing a signal suitable for coupling to a video display, to provide a repeatedly updated display of the scanned sample that is substantially unaffected by any variations in the intensity of the scanning laser beam or in the local concentration in the sample of the fluorescent indicator.

2. A confocal microscope as defined in claim 1, wherein:

the microscope further includes first and second averaging means for averaging a selected number of successive frames of image data representing the respective first and second wavelengths, to produce a sequence of related pairs of average image data for delivery to the ratio means;

the ratio means repeatedly computes and temporarily stores the ratio of average image data received from the respective first and second averaging means; and the video display provides a repeatedly updated display of the sequence of ratios of average image data.

3. A confocal microscope as defined in claim 2, wherein the video display provides a continuous display of the ratio of average image data currently stored by the ratio means, until the next successive ratio of average image data is received.

4. A confocal microscope as defined in claim 3, wherein:

the scanner scans the laser beam across the sample continuously;

the first and second detectors detect light emitted by the sample continuously and generate the succession of frames of image data continuously; and the frames of image data transferred by the transfer means to the permanent data storage device reflect all of the data generated by the first and second detectors.

5. A confocal microscope as defined in claim 4, wherein the transfer means is adapted to transfer frames of image data to the permanent data storage device at a frame rate that is the same as the frame rate at which the first and second detectors generate frames of image data.

6. A confocal microscope as defined in claim 2, wherein the first and second averaging means each include:

an adder for adding the current image data frame to a previous sum of image data frames to produce a current sum of image data frames;

means for delivering the current sum of image data frames for storage in the associated first or second frame memory;

means for selectively supplying the image data frame currently stored in the associated frame memory to the adder; and means operable during the time of the last frame in each sequence of image frames being averaged, for dividing by a predetermined integer the current sum of image data frames produced by the adder, to produce the average image data for delivery to the ratio means.

7. A confocal microscope as defined in claim 2, wherein:

the ratio means includes a single, bifurcated frame memory;

the transfer means transfers frames of average image data for the first and second wavelengths to the permanent data storage device in an alternating the successive average image data frames for the first wavelength are each stored for one frame duration in the first frame memory; and the successive average image data frames for the second wavelength are each stored for two frame durations in one half of the bifurcated frame memory of the ratio means.

8. A confocal microscope as defined in claim 7, wherein:

the first and second frame memories and the frame memory of the ratio means are of the same predetermined size; and the first and second frame memories each store just a single frame of image data and each receive data for storage immediately after previously-stored data is read out.

9. A confocal microscope as defined in claim 1, wherein:

the scanner scans across the sample in a raster-scan pattern; and the first and second detectors generate data representing video signals for each of the first and second wavelengths.

10. A method for scanning a sample doped with a predetermined fluorescent indicator and providing a video display of the sample, comprising the steps of:

repeatedly scanning a laser beam in two dimensions across the sample, whereupon the sample fluoresces in first and second predetermined wavelengths;

detecting light emitted by the sample in the first and second wavelengths and generating a succession of frames of image data representing a sequence of related pairs of simultaneous two-dimensional images of the sample, in the first and second wavelengths;

temporarily storing in first and second frame memories individual frames of image data for the respective first and second wavelengths;

transferring image data derived from the data for the first and second wavelengths, generated in the step of detecting, to a permanent data storage device in an alternating fashion;

repeatedly computing and temporarily storing the ratio of image data for the respective first and second wavelengths, to produce a sequence of image data ratios; and receiving the sequence of image data ratios produced in step of repeatedly computing and providing a video signal suitable for coupling to a video display, to provide repeatedly updated display of the scanned sample that is substantially unaffected by any variations in the intensity of the scanning laser beam or in the local concentration in the sample of the fluorescent indicator.

11. A method as defined in claim 10, wherein:

the method further includes a step of averaging a selected number of successive frames of image data representing the respective first and second wavelengths, to produce a sequence of related pairs of average image data for use in the step of repeatedly computing;

the step of repeatedly computing repeatedly computes and temporarily stores the ratio of average image data provided in the step of averaging; and the step of receiving provides a repeatedly updated display of the sequence of ratios of average image data.

12. A method as defined in claim 11, wherein the step of receiving provides a continuous display of the ratio of average image data currently stored in the step of repeatedly computing, until the next successive ratio of average image data is received.

13. A method as defined in claim 12, wherein:

the step of repeatedly scanning is performed continuously;

the step of detecting is performed continuously such that the succession of frames of image data are continuous; and the frames of image data transferred to the permanent data storage device in the step of transferring reflect all of the data generated in the step of detecting.

14. A method as defined in claim 13, wherein the step of transferring includes a step of selectively transferring frames of image data to the permanent data storage device at a frame rate that is the same as the frame rate at which the step of detecting generates frames of image data.

15. A method as defined in claim 11, wherein the step of averaging includes steps of:

adding the current image data frame to a previous sum of image data frames to produce a current sum of image data frames;

delivering the current sum of image data frames for storage in the associated first or second frame memory;

selectively supplying the image data frame currently stored in the associated frame memory to the adder; and during the time of the last frame in each sequence of image frames being averaged, dividing by a predetermined integer the current sum of image data frames produced in the step of adding, to produce the average image data for use in the step of repeatedly computing.

16. A method as defined in claim 11, wherein:

the step of repeatedly computing utilizes a single, bifurcated frame memory;

the step of transferring transfers average image data frames for the first and second wavelengths to the permanent data storage device in an alternating fashion;

the successive average image data frames for the first wavelength are each stored for one frame duration in the first frame memory; and the successive average image data frames for the second wavelength are each stored for two frame durations in one half of the bifurcated frame memory used in the step of repeatedly computing.

17. A method as defined in claim 16, wherein:

the first and second frame memories used in the step of temporarily storing and the frame memory used in the step of repeatedly computing are of the same predetermined size; and the step of repeatedly storing includes a step of receiving data for storage in the first and second frame memories immediately after previously-stored data is read out.

18. A method as defined in claim 10, wherein:

the step of repeatedly scanning includes a step of scanning across the sample in a raster-scan pattern; and the step of detecting includes a step of generating data representing video signals for each of the first and second wavelengths.

19. A confocal microscope for scanning a sample doped with a predetermined fluorescent indicator, comprising:

a scanner for repeatedly scanning a laser beam in a raster-scan pattern across the sample, whereupon the sample fluoresces in first and second predetermined wavelengths;

first and second photodetectors for detecting light emitted by the sample in the first and second wavelengths and for generating video signals constituting a succession of frames of image data representing a sequence of related pairs of simultaneous two-dimensional images of the sample, in the first and second wavelengths;

first and second frame memories for temporarily storing individual frames of image data for the respective first and second wavelengths;

first and second averaging means for averaging a selected number of successive frames of image data representing the respective first wavelength and the second wavelength, to produce a sequence of related pairs of average image data, wherein the first and second averaging means each include an adder for adding the current image data frame to a previous sum of image data frames to produce a current sum of image data frames, means for delivering the current sum of image data frames for storage in the associated first or second frame memory, means for selectively supplying the image data frame currently stored in the associated frame memory to the adder, and means, operable during the time of the last frame in each sequence of image frames being averaged, for dividing by a predetermined integer the current sum of image data frames produced by the adder, to produce the average image data;

a permanent data storage device; transfer means for transferring the average image data to the permanent data storage device alternately from the first and second averaging means;

ratio means for repeatedly computing and temporarily storing in a third frame memory the ratio of average image data received from the first and second averaging means, to produce a sequence of image data ratios; and video means for receiving the sequence of image data ratios produced by the ratio means and providing a signal suitable for coupling to a video display, to provide a continuous, repeatedly-updated display of the scanned sample that is substantially unaffected by any variations in the intensity of the scanning laser beam or in the local concentration in the sample of the fluorescent indicator.

20. A confocal microscope as defined in claim 19, wherein:

the scanner includes
 a laser for supplying the laser beam,
 a microscope objective,
 means for positioning the microscope objective adjacent to the sample to be scanned,
 means for repeatedly scanning the laser beam in a raster-scan pattern across the sample; and the confocal microscope further includes a video display for displaying the signal provided by the video means.

* * * * *